June 2, 1942.  E. C. HORTON ET AL  2,284,976
WIPER BLADE
Filed Dec. 19, 1939
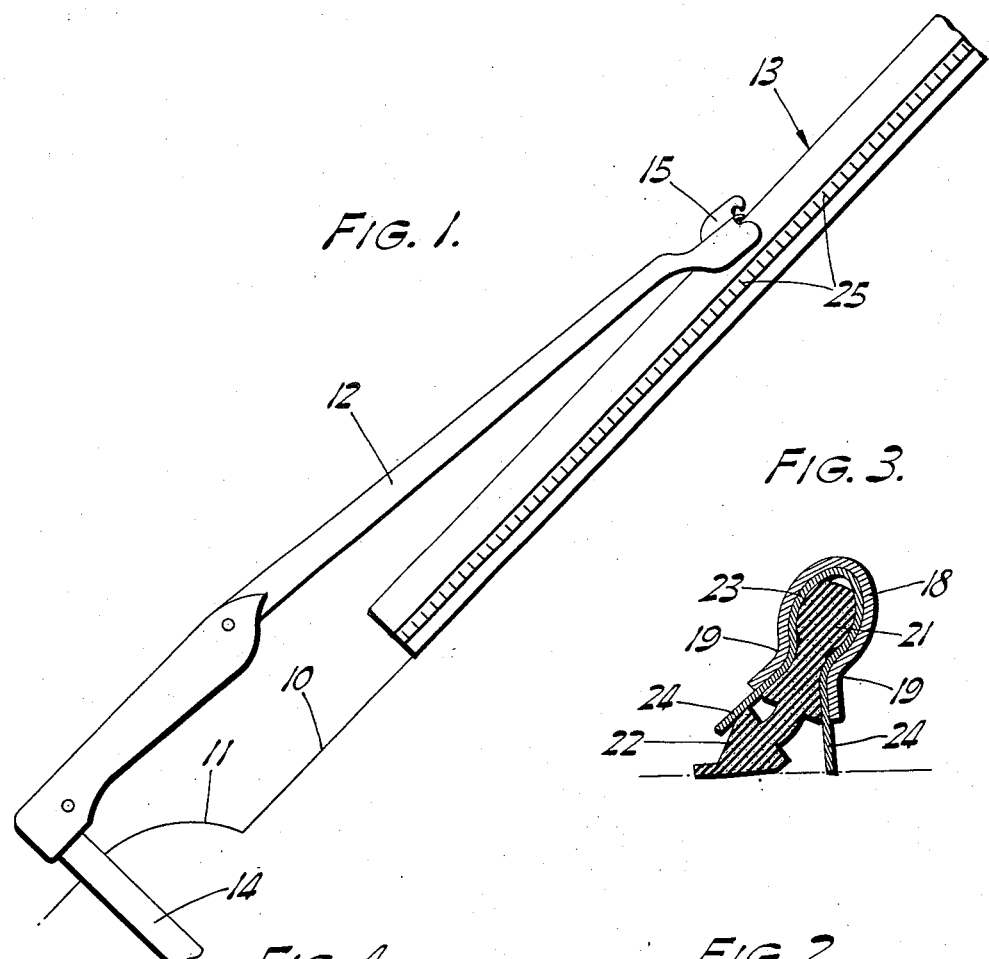
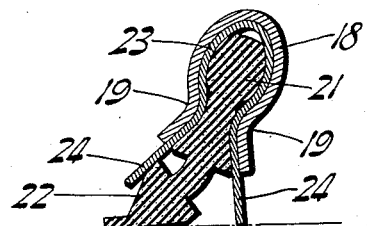
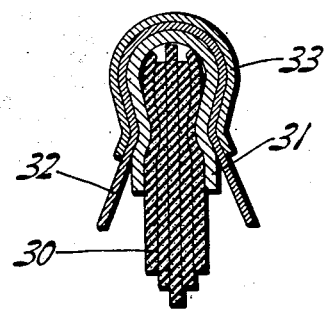
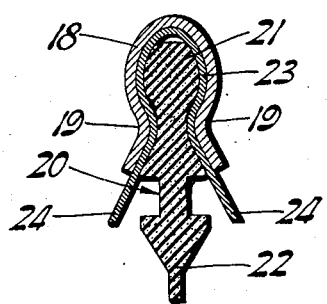
Erwin C. Horton
& Anton Rappl, INVENTORS
BY
Beau, Brooks, Buckley & Beau.
ATTORNEYS Patented June 2, 1942

2,284,976

UNITED STATES PATENT OFFICE 2,284,976

WIPER BLADE

Erwin C. Horton, Hamburg, and Anton Rappl, Buffalo, N. Y., assignors to Trico Products Corporation, Buffalo, N. Y.

Application December 19, 1939, Serial No. 310,007

3 Claims. (Cl. 15—250)

This invention relates to window wipers and has particular reference to wiping blades of the kind conventionally provided for wiping the windshields of vehicles.

Difficulty has been encountered in the past in accomplishing wholly successful wiping of windshields under all conditions of operation and a substantial part of this difficulty is attributable to the failure of conventional wiping blades to properly cope with matter other than water, in its liquid condition. The well recognized sources of trouble on this score are the formation of ice and frost in winter and the gathering upon the windshield of dead insects of various sorts in warmer weather.

In providing a wiper blade which overcomes this inadequacy of prior art devices we associate a more or less conventional wiping strip with other windshield contacting means in the nature of a wiping or scraping element formed of a material which is resilient but not as readily yieldable as elastic rubber; that is, one which will efficaciously remove more or less adherent matter from the windshield without scratching or spoiling the surface of the windshield. This association is effected in a novel manner and in such a way that the normal and usual operation of the wiping strip proper is not interfered with and is, in fact, improved by the cooperation therewith of the scraping element.

The cooperating wiping or scraping element which forms a part of our invention, in addition to its scraping function, serves as a resilient lateral reinforcement for the usually more flexible and more elastic wiping strips. Materials which have been found to serve satisfactorily the needs of the present invention are cellulose ester and ether plastics such as pyroxylin and cellulose acetate and various plastics formed by the condensation of either natural or synthetic resins. The principal requirements are that the material be sufficiently stiff and unyielding to accomplish the intended purpose and still of sufficient resilience for proper positioning, while not being hard enough to scratch the surface of a windshield while operating thereacross.

In the drawing:

Fig. 1 is a fragmentary side elevational view of a windshield wiper arm and blade assembly associated with the windshield of a vehicle and embodying the principles of the present invention;

Fig. 2 is a transverse cross sectional view through the wiping element of Fig. 1 and shown on an enlarged scale;

Fig. 3 is a view similar to Fig. 2 but with the wiping element shown acting upon a windshield; and, Fig. 4 is a transverse cross sectional view of a modified form of wiping element.

In the drawing like characters of reference denote like parts and the numeral 10 designates the surface of a vehicle windshield having a framing portion 11 associated therewith. A windshield wiper arm 12 of conventional construction has a wiping element, designated generally 13, associated therewith, and is itself supported by a wiper actuating shaft 14.

Means for readily attaching the wiping element 13 to the wiper arm 12 are indicated at 15 and such means may be of conventional form. Referring particularly to Fig. 2, one form of wiping element which embodies the principles of our invention comprises an elongate holder 18 generally channel-shaped in cross section and having a medial portion of reduced transverse dimension as at 19 whereby suitable wiping means may be conveniently retained therein.

Disposed within the channel-shaped holder 18 is a wiping strip 20 which may be of various conformation and construction but which, for the purpose of illustration, is shown as comprising a rubber strip having, in transverse cross section, a bulbous head portion 21 and a generally V-shaped lower portion 22 comprising a windshield-engaging wiping edge. The rubber wiping strip shown in the drawing is of the type known in the art as a molded blade but other conventional wiping strips of rubber or similar material may serve the purposes of this element of the present combination.

Still referring to Fig. 2, there is interposed between the channel-shaped holder and the wiping strip 20 a strip of material the general nature and requirements of which have been referred to in the foregoing and for the purposes of giving a specific example of a material meeting these requirements reference is had to flexible Celluloid. This strip is designated 23 in Fig. 2 and its opposite marginal edges extend below the lower edges of the channel-shaped holder 18 as at 24 to provide oppositely disposed auxiliary wiping edges for cooperation with the wiping action of the wiping portion 22 of the rubber strip 20.

Fig. 3 illustrates the manner of such cooperation and as the parts are shown in this figure the wiping element is moving from left to right. The rubber wiping strip performs its function in approximately the usual manner with the qualification that it is backed up and to some extent reinforced by the trailing one of the marginal portions 24 of the flexible element 23. The leading one of the marginal portions 24 precedes the rubber strip 20 in its path of travel across the windshield and exerts a yielding scraping action on the surface of the windshield which serves to dislodge adherent foreign matter without scraping or marring of the surface of the glass. The scraping action of the marginal portion 24 is found to be assisted by the provision of a plurality of slits 25 in the scraping edges thereof as appears in Fig. 1.

The embodiment of Fig. 4 provides a structure which, among other things, affords the advantages of the present invention in connection with existing wiper blade installations. A conventional wiping strip or strips 30, supported in a channel-shaped carrier 31, have associated therewith a flexible scraping element 32 similar in general conformation and material of construction to the element 23 of the previously described embodiment. The scraping element 32, however, is adapted to fit over the channel-shaped carrier 31 and a retaining means 33 is provided in the form illustrated. The retaining means may conveniently comprise a resilient channel-shaped element and in a preferred form is of approximately the same length as the wiping strip 30, the carrier 31, and the scraping element 32.

Various modifications may be made in the precise manner of constructing the device of the present invention without departing from the spirit and scope of the invention and the latter is not to be regarded as limited otherwise than as defined in the appended claims.

We claim:

1. In a windshield wiping element, a resilient wiping strip having marginal edges of enlarged cross-section and an intermediate web portion of reduced thickness, one marginal edge portion being enclosed in a channel holder and the opposite marginal portion constituting a wiping edge, and scraping means comprising a channel-shaped element of more rigid material than said wiping strip, said scraping means embracing the one marginal portion of said wiping strip within said channel support and the opposite legs of said scraping means comprising outwardly flaring marginal scraping edges, the marginal portion of said wiping strip within said channel being adapted to give resilient backing to either of the scraping edges when such scraping edge is in scraping position, with the opposite marginal scraping edge in engagement with the enlarged marginal portion which constitutes the wiping edge of said wiping strip to provide a backing therefor, the intermediate reduced web portion of said wiping strip permitting relatively ready movement of the wiping edge of said strip from one to the other of its limit positions as defined by said marginal scraping edges.

2. In a windshield wiping element, a resilient wiping strip, one marginal edge portion being enclosed in a channel holder and the opposite marginal portion constituting a wiping edge, and scraping means comprising a channel-shaped element of more rigid material than said wiping strip, said scraping means embracing the one marginal portion of said wiping strip within said channel support and the opposite legs of said scraping means comprising outwardly flaring marginal scraping edges, the marginal portion of said wiping strip within said channel flaring outwardly toward the wiping edge whereby to give resilient backing to the scraping edges and define their flaring directions.

3. A wiper blade comprising a soft cushion body of strip form having a longitudinal wiping edge, a channeled holder embracing the opposite edge, and a scraping member held by the latter against the cushion body to receive cushioned support therefrom, said scraping member having an active edge projecting from said holder, the cushion body within the holder having a yieldable enlargement supporting the scraping member in a manner to space the active edge of the latter from the wiping edge.

ERWIN C. HORTON.
ANTON RAPPL.